(12) United States Patent
Sherrod

(10) Patent No.: US 7,163,477 B1
(45) Date of Patent: Jan. 16, 2007

(54) CONTINUOUSLY VARIABLE TRANSMISSION WITH DECOUPLED CENTRIFUGAL WEIGHT

(75) Inventor: Sean E. Sherrod, Lino Lakes, MN (US)

(73) Assignee: Polaris Industries, Inc., Medina, MN (US)

( * ) Notice: Subject to any disclaimer, the term of this patent is extended or adjusted under 35 U.S.C. 154(b) by 525 days.

(21) Appl. No.: 10/714,716

(22) Filed: Nov. 17, 2003

(51) Int. Cl.
*F16H 61/32* (2006.01)
*F16H 55/36* (2006.01)

(52) U.S. Cl. .......................................... 474/14; 70/13
(58) Field of Classification Search ............ 474/12–15, 474/19, 23, 70; 475/208, 211; 477/45–49
See application file for complete search history.

(56) References Cited

U.S. PATENT DOCUMENTS

| 3,269,207 | A | * | 8/1966 | Borsattino ................... 474/14 |
| 3,653,283 | A | * | 4/1972 | Betz ........................... 474/14 |
| 3,850,050 | A | * | 11/1974 | Lemmens ................... 474/13 |
| 4,174,641 | A |   | 11/1979 | Hillman |
| 4,449,957 | A | * | 5/1984 | Kapaan ...................... 474/14 |
| 4,493,221 | A | * | 1/1985 | Stieg et al. ................. 474/14 |
| 5,527,225 | A |   | 6/1996 | Dick |
| 6,050,911 | A | * | 4/2000 | Feuchter et al. ............. 474/12 |
| 6,244,986 | B1 |   | 6/2001 | Mori et al. |
| 6,379,282 | B1 |   | 4/2002 | Aoki |
| 6,406,390 | B1 |   | 6/2002 | Roby |
| 6,440,037 | B1 |   | 8/2002 | Takagi et al. |
| 6,524,216 | B1 |   | 2/2003 | Suzuki et al. |
| 2001/0021683 | A1 | | 9/2001 | Takagi et al. |
| 2001/0027147 | A1 | | 10/2001 | Shinso et al. |
| 2001/0049312 | A1 | | 12/2001 | Warner et al. |
| 2002/0155909 | A1 | | 10/2002 | Roby |

FOREIGN PATENT DOCUMENTS

JP          62-209260 A  *  9/1987  ................... 474/13

* cited by examiner

*Primary Examiner*—Marcus Charles
(74) *Attorney, Agent, or Firm*—Baker & Daniels LLP

(57) ABSTRACT

A drive clutch for a CVT comprising a stationary sheave, a movable sheave, a motor and a centrifugal weight system. The movable sheave is movable closer to or further from the stationary sheave relative to a longitudinal axis. The motor may be coupled to an input shaft such that it is rotatable relative to or independently of the rotation of the input shaft. The centrifugal weight system is operably connected to the motor so as to pivot centrifugally outward relative to the longitudinal axis in response to the rotation of the motor, moving the movable sheave closer to or further from the stationary sheave.

22 Claims, 8 Drawing Sheets

CONTINUOUSLY VARIABLE TRANSMISSION WITH DECOUPLED CENTRIFUGAL WEIGHT

TECHNICAL FIELD

The present invention relates to transmission systems for recreational type vehicles.

BACKGROUND OF THE INVENTION

Split sheave, belt-driven continuously variable transmissions (CVT's) are used in a variety of recreational type off-road vehicles such as snowmobiles, golf carts, all-terrain vehicles (ATV's), and the like. CVT's, as their name implies, do not require shifting through a series of forward gears, but rather provide a continuously variable gear ratio that automatically adjusts as the vehicle speeds up or slows down, thus providing relatively easy operation for the rider.

A typical CVT transmission is made up of a split sheave primary drive clutch connected to the output of the vehicle engine (often the crankshaft) and split sheave secondary driven clutch connected (often through additional drive train linkages) to the vehicle axle. An endless, flexible, generally V-shaped drive belt is disposed about the clutches. Each of the clutches has a pair of complementary sheaves, one of the sheaves being movable with respect to the other. The effective gear ratio of the transmission is determined by the positions of the movable sheaves in each of the clutches. The primary drive clutch has its sheaves normally biased apart (e.g., by a coil spring), so that when the engine is at idle speeds, the drive belt does not effectively engage the sheaves, thereby conveying essentially no driving force to the secondary driven clutch. The secondary driven clutch has its sheaves normally biased together (e.g., by a torsion spring working in combination with a helix-type cam, as described below, so that when the engine is at idle speeds the drive belt rides near the outer perimeter of the driven clutch sheaves.

The spacing of the sheaves in the primary drive clutch usually is controlled by centrifugal flyweights. Centrifugal flyweights are typically connected to the engine shaft so that they rotate along with the engine shaft. As the engine shaft rotates faster (in response to increased engine speed) the flyweights also rotate faster and pivot outwardly, urging the movable sheave toward the stationary sheave. The more outwardly the flyweights pivot, the more the moveable sheave is moved toward the stationary sheave. This pinches the drive belt, causing the belt to begin rotating with the drive clutch, the belt in turn causing the driven clutch to begin to rotate. Further movement of the device clutch's movable sheave toward the stationary sheave forces the belt to climb outwardly on the drive clutch sheaves, increasing the effective diameter of the drive belt path around the drive clutch. Thus, the spacing of the sheaves in the drive clutch changes based on engine speed. The drive clutch therefore can be said to be speed sensitive.

As the sheaves of the drive clutch pinch the drive belt and force the belt to climb outwardly on the drive clutch sheaves, the belt (not being relatively stretchable) is pulled inwardly between the sheaves of the driven clutch, decreasing the effective diameter of the drive belt path around the driven clutch. This movement of the belt outwardly and inwardly on the drive and driven clutches, respectively, smoothly changes the effective gear ratio of the transmission in variable increments.

Split-sheave, belt driven CVTs are typically purely mechanical devices, that is, the mechanical parameters are established when the CVT is assembled. Once the CVT is assembled, the gear ratio depends on these set mechanical parameters. For example, the gear ratio depends on the distance between the drive clutch sheaves. The distance between the drive clutch sheaves is determined by the amount of force produced by the flyweights against the movable sheave. As the flyweights are attached to the engine shaft, the amount of the flyweight force depends on the speed of rotation of the engine shaft. Thus, with these prior devices, it is difficult to modify the gear ratio without disassembling the CVT and readjusting the mechanical parameters.

There are many situations in which it would be desirable to be able to easily modify the gear ratio of a CVT. It would be particularly desirable to be able to modify the gear ratio of a CVT during the actual operation of the CVT, to fit variable operating conditions. In some operating conditions, the mechanical gear ratio is less than optimal. For example, when the vehicle is traveling along at a given speed and then the rider momentarily lets off on the throttle, the centrifugal movement of the flyweights and other forces is disrupted, and can cause the system to momentarily shift out of the desired transmission ratio. When the rider then again applies the throttle, torque is restored to the driven clutch, but the transmission is no longer in its optimal gear ratio, and takes a moment to adjust. Similarly, if the drive wheels momentarily leave the ground (such as when a professional rider goes off a jump) but the rider does not let off on the throttle, the load on the drive wheels is momentarily substantially reduced, again disrupting the balance of forces within the CVT and causing it to temporarily shift out of the desired gear ratio. When load is restored to the drive wheels, the CVT must again readjust to the proper gear ratio. Thus, there are situations in which it would be desirable to modify the gear ratio independently of the mechanical parameters set by the CVT at the time of manufacture.

SUMMARY OF THE INVENTION

The present invention provides a CVT where the natural speed of the centrifugal weights on the drive clutch may be accelerated or decelerated via electro-mechanical means in order to selectively change the gear ratio provided by the CVT. The electro-mechanical means operates to modify the gear ratio determined by the mechanical parameters established during assembly of the CVT. In preferred embodiments, electro-mechanical means comprises a motor. In particularly preferred embodiments the electro-mechanical means comprises an electric motor. The motor can be connected directly to the input shaft or it can be independent of the input shaft.

The present CVT provides a drive clutch connected to an input shaft of an engine and is rotatable about a longitudinal axis. The clutch comprises a stationary sheave and a movable sheave, the movable sheave being movable closer to and further from the stationary sheave. In preferred embodiments, a motor is connected to the input shaft and is also rotatable about a longitudinal axis. The motor is rotatable along with or independently of the rotation of the input shaft (and drive clutch). A centrifugal weight system is operably connected to the motor so as to pivot centrifugally outward relative to the longitudinal axis in response to rotation of the motor. An increase in pivoting urges the movable sheave closer to the stationary sheave and a decrease in pivoting allows the movable sheave to move further from the stationary sheave, thus modifying the gear ratio of the transmission system. The CVT of the invention can be provided in any recreational vehicle.

DETAILED DESCRIPTION OF THE PREFERRED EMBODIMENTS OF THE INVENTION

The following detailed description should be read with reference to the drawings, in which like elements in different drawings are numbered identically. The drawings depict selected embodiments and are not intended to limit the scope of the invention. It will be understood that embodiments shown in drawings and described above are merely for illustrative purposes, and are not intended to limit scope of the invention as defined in the claims that follow.

Figure 1:
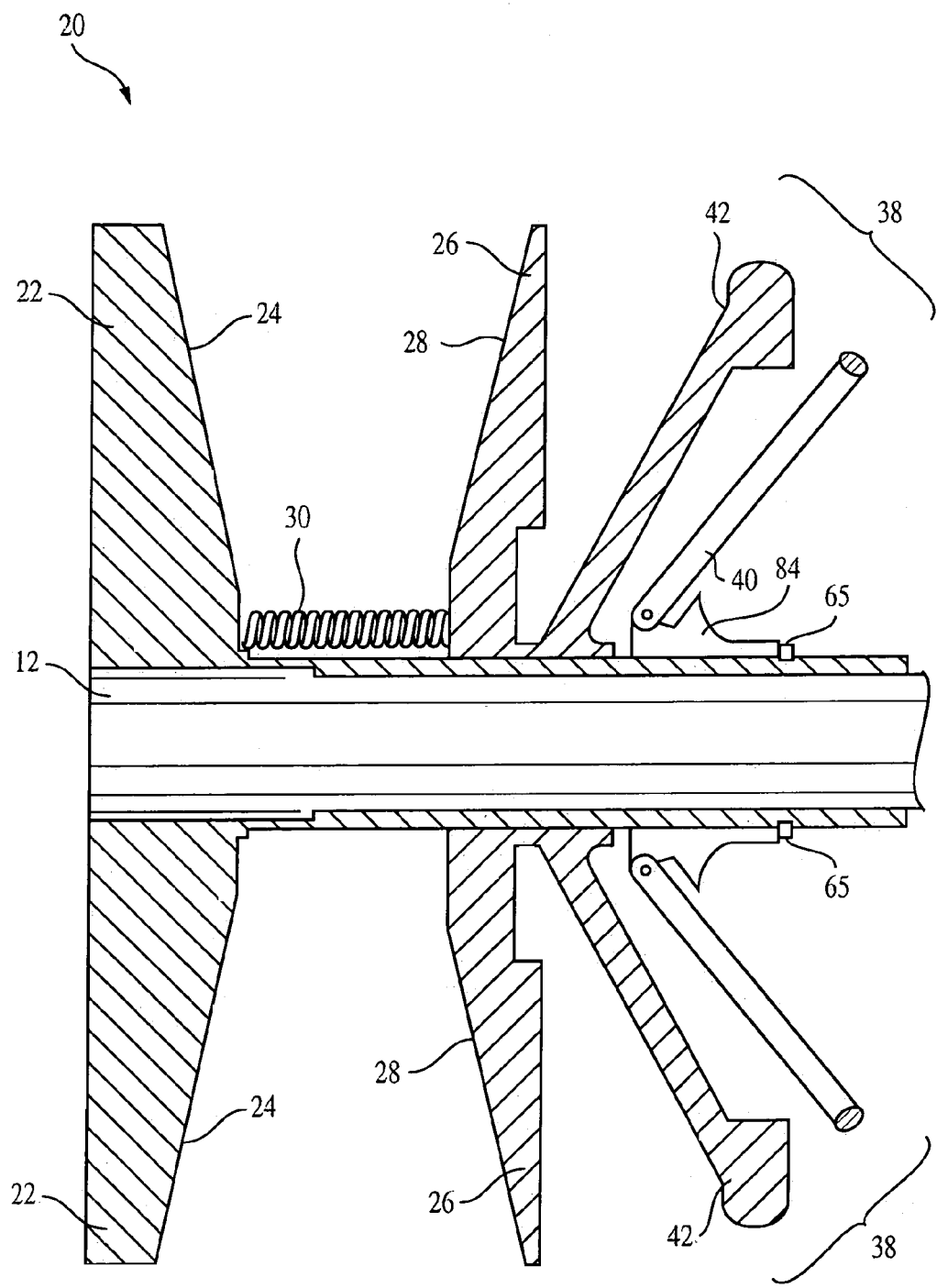
FIG. 1 is a cross-sectional view of a primary drive clutch known in the art.

FIG. 1 is a cross-sectional view of a primary drive clutch known in the art. The drive clutch 20 is mounted to a rotatable input shaft 12 that rotates about a longitudinal axis. The drive clutch 20 includes a stationary sheave 22 having an inner belt-engaging surface 24 and a movable sheave 26 having a complementary inner belt-engaging surface 28. The movable sheave 26 moves along the longitudinal axis, i.e., closer to and further from the stationary sheave 22. A coil spring 30 is positioned in between the sheaves for biasing the movable sheave 26 away from the stationary sheave 22. The belt-engaging surfaces of the sheaves are tapered so that together they form generally the shape of a V, which generally matches the V-shaped angle of the drive belt (not shown).

The drive clutch 20 also includes a centrifugal weight system 38, which urges the movable sheave 26 closer to the stationary sheave 22 in response to rotation of the drive clutch 20 and input shaft 12. The centrifugal weight system 38 typically includes one or more flyweights 40 that are connected to the input shaft 12 through a flyweight pivot base 84. The flyweights 40 are adapted to pivot centrifugally outward relative to the longitudinal axis upon rotation of the input shaft 12. The faster the rotation of the input shaft 12, the faster the rotation of the flyweights 40, and the more the flyweights 40 pivot centrifugally outward. The centrifugal weight system 38 also includes a reaction arm 42 positioned in between each flyweight and the movable sheave 26. A snap ring 65 holds the flyweight pivot base 84 in place. When the flyweights 40 pivot centrifugally outward, they exert force against the reaction arms 42, which cause the movable sheave 26 to move closer to the stationary sheave 22.

The drive belt rides near the center of the drive clutch 20 when the engine (and, hence, the drive clutch) is rotating at slow speeds. When the engine is rotating at higher speeds, the centrifugal weight system 38 urges the movable sheave 26 toward the stationary sheave 22, thereby pinching the belt and causing it to move outwardly between the sheaves. The opposite happens in the driven clutch.

The operation of the centrifugal weight system 38 described in FIG. 1 is purely mechanical. The centrifugal pivoting of the flyweights 40 is dependent upon the speed of rotation of the input shaft 12 (and hence, drive clutch). When the input shaft 12 rotates at lower speeds, little pivoting of the flyweights 40 is seen. When the input shaft 12 rotates at higher speeds, more pivoting of the flyweights 40 is seen. Under this prior centrifugal weight system 38, there is no ability to control the pivoting of the flyweights 40 independently of the rotation of the input shaft 12, since the flyweights 40 are attached directly to the input shaft 12.

Figure 2:
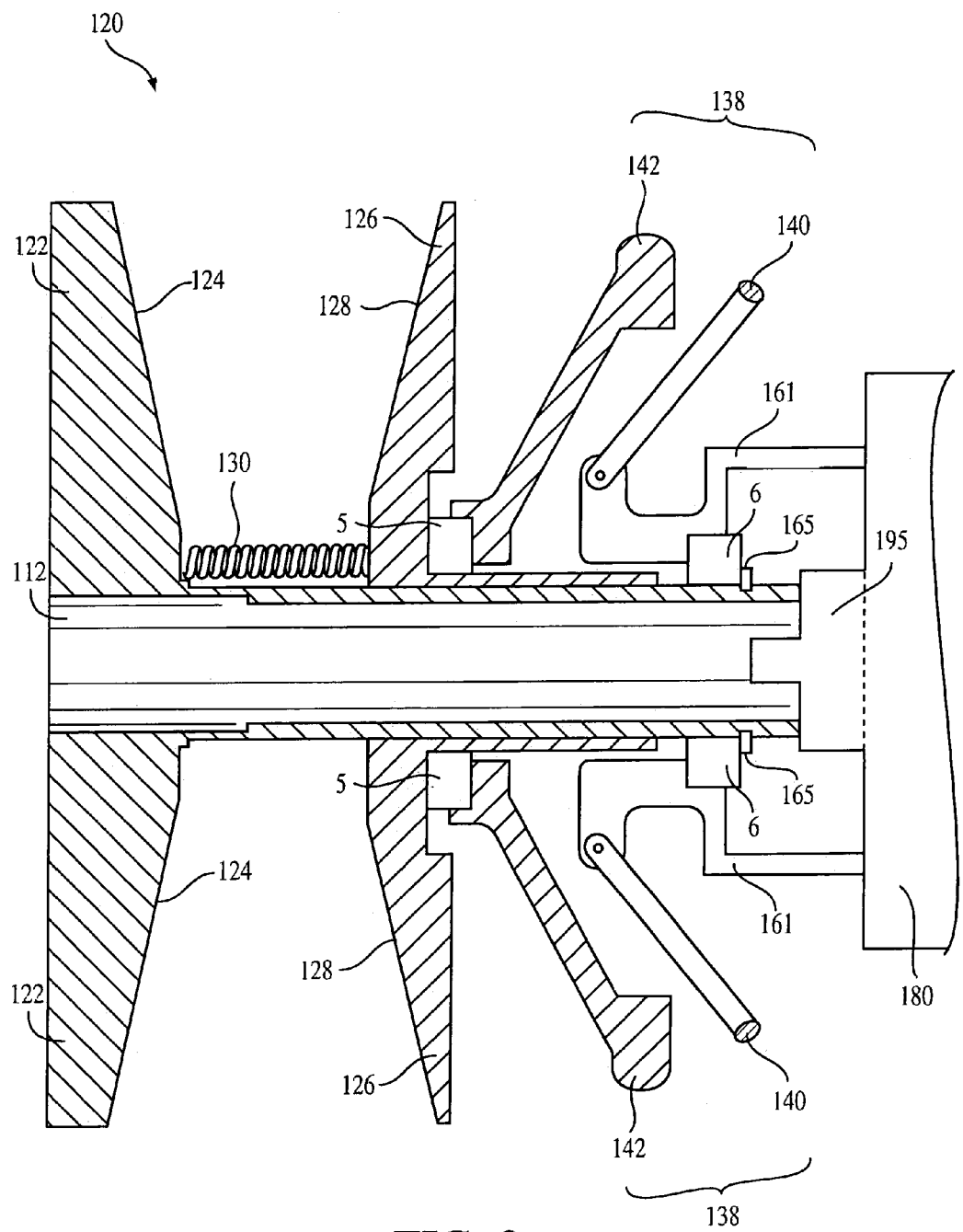
FIG. 2 is a cross-sectional view of a primary drive clutch according to an embodiment of the invention.

FIG. 2 is a cross-sectional view of a drive clutch in accordance with an embodiment of the present invention. While the details of the invention are described with reference to a particular type of CVT or with reference to a particular type of drive clutch, it will be understood that variations in the structure and components of the basic CVT and drive clutch can be made while still employing the substance of the invention. As with prior conventional drive clutches, the preferred drive clutch 120 is mounted to a rotatable input shaft 112 that rotates about a longitudinal axis. The drive clutch 120 includes a stationary sheave 122 having an inner belt-engaging surface 124 and a movable sheave 126 having a complementary inner belt-engaging surface 128. The movable sheave 126 moves closer to and further from the stationary sheave 122. A coil spring 130 is preferably positioned in between the sheaves for biasing the movable sheave 126 away from the stationary sheave 122. The belt-engaging surfaces of the sheaves are preferably tapered so that together they form generally the shape of a V, which generally matches the V-shaped angle of a drive belt (see FIG. 3).

In accordance with an embodiment of the present invention, the drive clutch 120 further includes an electro-mechanical apparatus coupled to a centrifugal weight system. In preferred embodiments, the electro-mechanical apparatus is in the form of a motor 180. In particularly preferred embodiments, the motor 180 is an electric motor. It should be understood by one of skill in the art that any electro-mechanical apparatus could be employed that is capable of rotating a centrifugal weight system.

The electro-mechanical apparatus can be connected directly to the input shaft 112 or it can be mounted near the input shaft 112 (but unconnected directly to). When the electromechanical apparatus is directly connected to the input shaft, it rotates the centrifugal weight system relative to the rotation of input shaft 112. When the electromechanical apparatus is not connected to the input shaft 112, it rotates the centrifugal weight system independently of the rotation of the input shaft 112.

FIG. 2 illustrates a motor 180 coupled directly to the rotatable input shaft 112 through an interface 195 that is fixed to the input shaft. When the motor 180 is in an OFF mode, the motor 180 and the motor interface 195 rotate along with and at the same speed as the rotatable input shaft 112. In these cases, the operation of the drive clutch 120 is purely mechanical, as with the prior art. However, when the motor 180 is in an ON mode, it rotates at a speed relative to the rotatable input shaft 112. The motor 180 is capable of rotating forward (in the same direction of rotation of the input shaft 112) or backward (in the opposite direction of rotation of the input shaft 112). Consequently, the motor 180 can rotate faster or slower than the rotation speed of the input shaft 112 (and hence the drive clutch).

A centrifugal weight system 138 is coupled to the motor 180. In prior art drive clutches (as is shown in FIG. 1), a centrifugal reaction arm 142 is often coupled directly to the movable sheave 126. In the present system, the centrifugal reaction arm 142 is not coupled to the movable sheave 126, but to the motor 180. The centrifugal weight system 138 can include any weight system known to be used in CVT drive clutches to force the movable sheave to move closer to the stationary sheave, so long as the weight system can be coupled directly to the motor 180 rather than the movable sheave 126. In preferred embodiments, the centrifugal weight system 138 includes one or more flyweights 140 that are connected to the motor 180 with a linkage 161. The flyweights 140 are adapted to pivot centrifugally outward relative to the longitudinal axis upon rotation of the motor 180. The faster the rotation of the flyweights 140, the more the flyweights 140 pivot centrifugally outward. The centrifugal weight system 138 also includes a reaction arm 142 positioned in between each flyweight and the movable sheave 126. Bearings 5 and 6 are provided to ensure that the centrifugal weight system is decoupled from the rotatable input shaft 112 and the movable sheave 126. When the flyweights 140 pivot centrifugally outward, they exert force against the reaction arms 142, which cause the movable sheave 126 to move closer to the stationary sheave 122.

Thus, when the motor 180 is in an OFF mode, the flyweights 140 (and the motor interface 195 of the connected motor 180) rotate at the speed of rotation of the input shaft 112. Under this mode of operation, the flyweights 140 pivot centrifugally outward relative to the longitudinal axis upon rotation of the input shaft 112 (and motor 180). When the motor 180 is in an ON mode, the flyweights 140 rotate at speeds either faster or slower than the speed of rotation of the input shaft 112.

If the motor 180 is rotating forward, the flyweight speed of rotation is faster than the speed of rotation of the input shaft 112. The flyweight speed of rotation is the speed of rotation of the input shaft 112 plus the speed of rotation of the motor 180. Here, there is more centrifugal pivoting of the flyweights 140 than would be seen if the flyweights 140 were rotating at the speed of the input shaft 112. This extra pivoting movement causes the moveable sheave 126 to move closer to the fixed sheave 122 to create a gear ratio that is higher (i.e., causing less reduction) than the ratio typically established at that particular speed of the drive clutch without the motor 180.

If the motor 180 is rotating backward, the flyweight speed of rotation is slower than the speed of rotation of the input shaft 112. The flyweight speed of rotation is the speed of rotation of the input shaft 112 minus the speed of rotation of the motor 180. Here, there is less centrifugal pivoting of the flyweights 140 than would be seen if the flyweights 140 were rotating solely at the speed of the input shaft 112. This reduced pivoting movement causes the moveable sheave to move farther from the fixed sheave to create a gear ratio that is lower (i.e., causing more reduction) than the ratio typically established at the particular speed with the motor 180 absent.

Variations of the ON mode can be provided for the motor 180. For example, in certain embodiments, the motor has an OFF mode, a forward ON mode and a backward ON mode. In the forward ON mode, the motor rotates in the same direction as the input shaft 112. In the backward ON mode, the motor rotates in the opposite direction of the input shaft 112. In the ON mode, the motor 180 can also be controlled to operate at any speed between maximum forward and maximum backward speeds.

Figure 4:
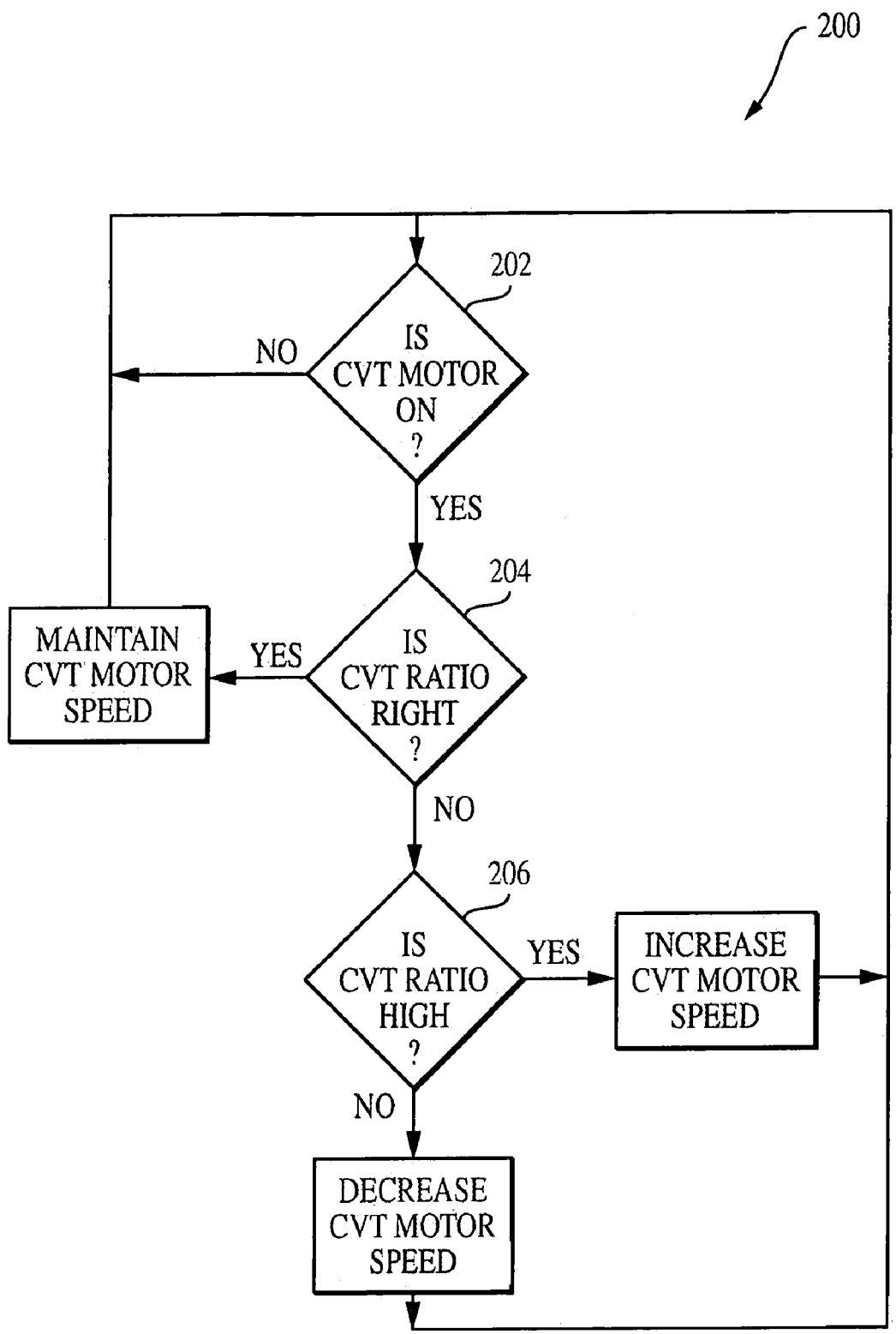
FIG. 4 is a block diagram showing a motor control system according to an embodiment of the invention.

The present invention also provides one or more control systems for automatically controlling the operation of the motor 180. FIG. 4 illustrates a basic control system 200 in accordance with an embodiment of the invention. At block 202 it is determined whether the motor is in an ON mode. If so, then at block 204 it is determined whether the CVT gear ratio is correct. If so, then the current speed of rotation of the motor is maintained. If not, then at block 206 it is determined whether the CVT gear ratio is high. If so, then the speed of rotation of the motor is decreased. If not, then the speed of rotation of the motor is increased. Thus, in this embodiment, the motor operates according to the established automatic control scheme of control system 200.

Figure 5:
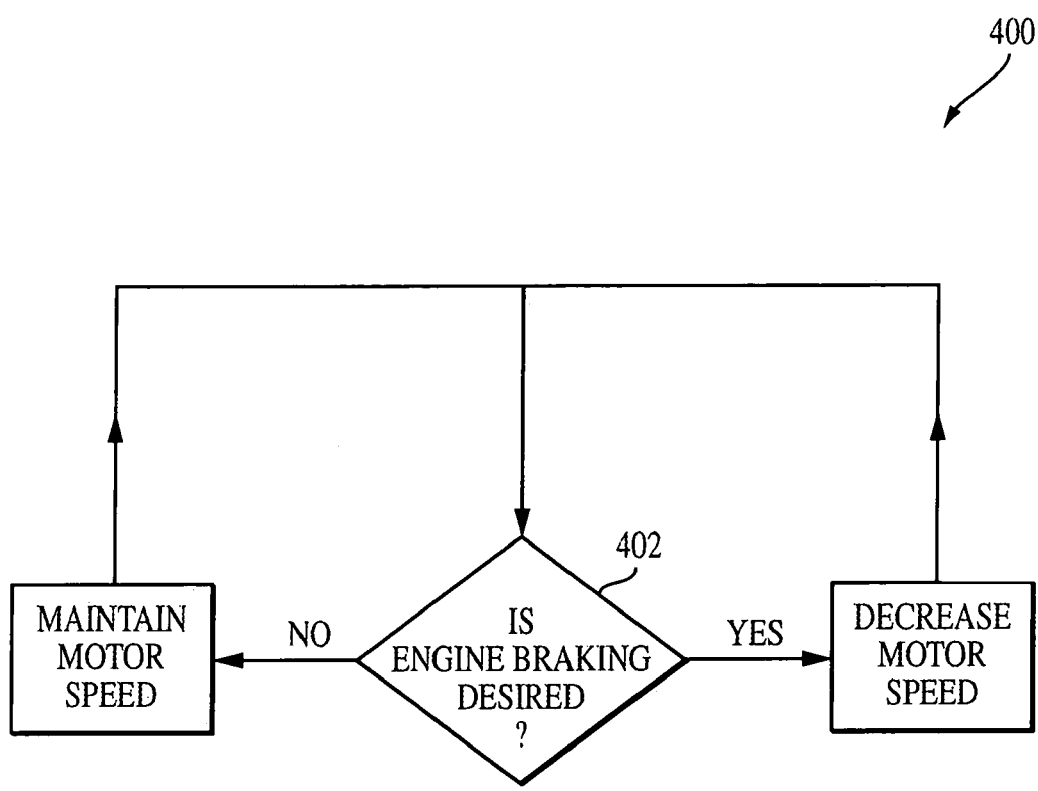
FIG. 5 is a block diagram showing a motor control system according to a second embodiment of the invention.

Other automatic control systems may be included to provide automatic motor control for various operating conditions. For example, in some embodiments, a control system is provided for operating the motor according to different engine braking settings. Some vehicle drivers prefer more engine braking than others. FIG. 5 illustrates a basic control system 400 in accordance with this embodiment of the invention. At block 402 it is determined whether engine braking is desired. If so, then the current speed of rotation of the motor is decreased. If not, then the speed of rotation of the motor is maintained. When the speed of rotation of the motor is decreased, the rotation of the flyweights is also decreased, which causes the moveable sheave to move further from the stationary sheave, thus downshifting into a lower gear ratio (i.e., causing higher reaction).

A switch or a sensor can be provided to feed input into block 402 of the control system. In some embodiments, a switch is provided about the vehicle in proximity to the driver to enable the driver to manually switch between different engine braking settings. For example, the driver could switch between an ON and OFF engine braking mode. The ON engine braking mode could be used when the vehicle is operated on hilly terrain where engine braking is often desired to reduce brake effort and wear on the brake pads. The OFF engine braking mode could be used when the vehicle is operated on flatter terrain where engine braking is often undesirable because riders prefer to coast as far as possible. This switch would then direct the driver's input to block 402 of the control system 400.

Figure 6:
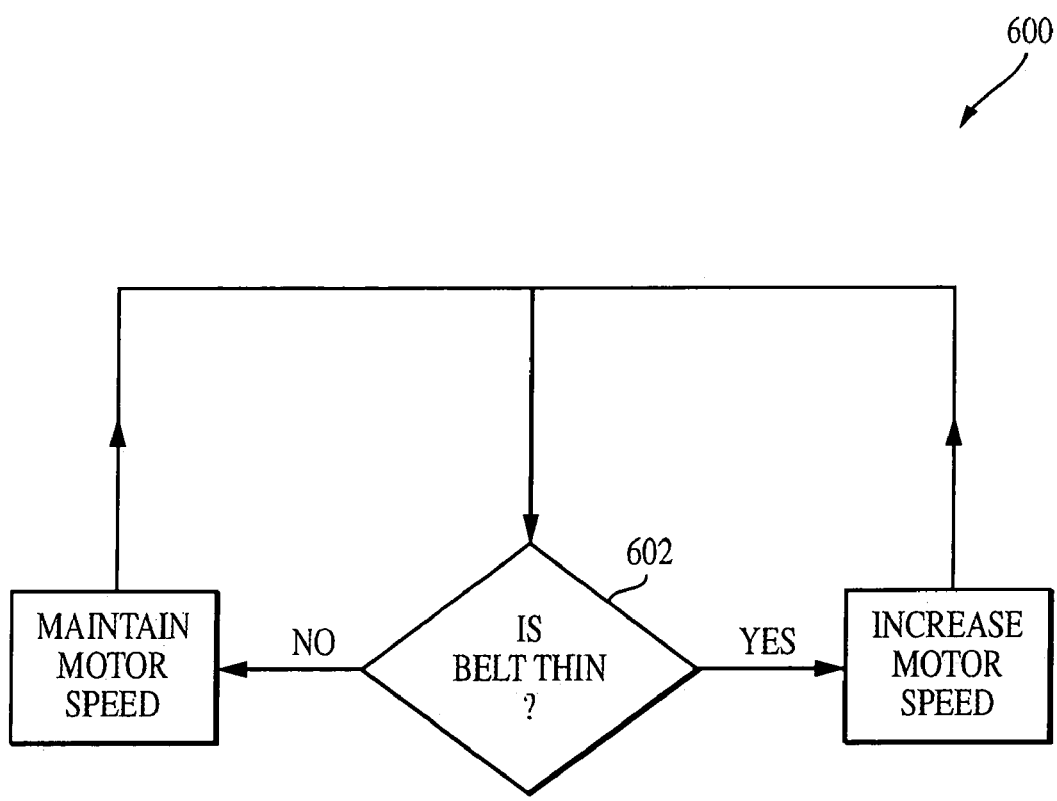
FIG. 6 is a block diagram showing a motor control system according to a third embodiment of the invention.

In some embodiments, a control system is provided for operating the motor when the CVT belt has been worn. CVT belts tend to wear slowly over time. This wear decreases the belt thickness and can change the way that a CVT operates. For example, when the sheaves of a drive clutch clamp against a thin belt, the belt may not be properly clamped, causing the CVT to remain in a lower gear than desired. An automatic control system is provided to operate the motor differently when the belt is thin. FIG. 6 illustrates a basic control system 600 in accordance with this embodiment of the invention. At block 602, it is determined whether the drive belt is thin. If so, then the speed of rotation of the motor is increased. If not, then the current speed of rotation of the motor is maintained. When the speed of rotation of the motor is increased, the rotation of the flyweights is also increased, which causes the moveable sheave to move even closer to the stationary sheave, thus increasing the ratio (i.e., causing less reduction).

A switch or a sensor can be provided to feed input into block 602 of the control system 600. In some embodiments, the vehicle driver decides whether the drive belt is thin (i.e., a driver can assume that after a specific period of time or after a specific number of uses of the vehicle that the belt is thin). A switch is provided about the vehicle in proximity to the driver to manually switch between different drive belt settings. For example, the driver could switch between a NORMAL and a THIN mode. This switch would then direct the driver's input to block 602 of the control system 600.

In other embodiments, a sensor and a processor are provided. The processor determines the thickness of the drive belt based on a calculation of ground speed, engine speed, and throttle position. If engine speed is high, throttle position is medium, and ground speed is low, the processor would be able to determine that the CVT is not shifting to the highest gear, likely due to a thin belt. The output of the processor is then fed into block 602.

Figure 7:
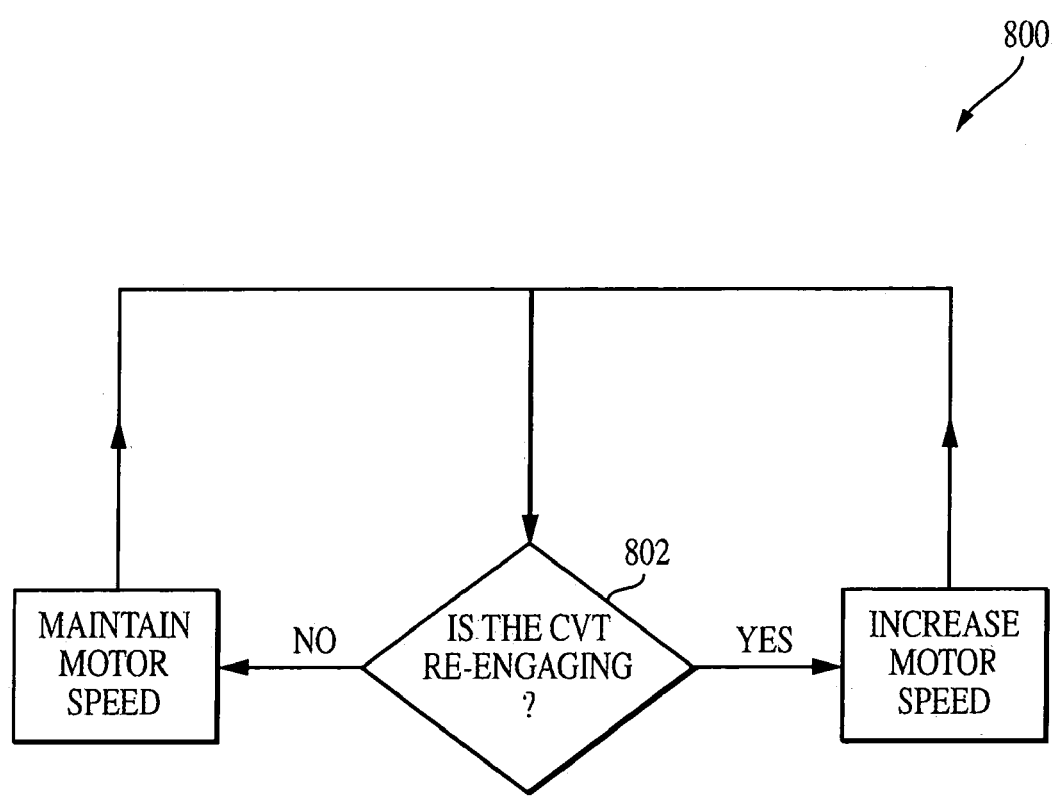
FIG. 7 is a block diagram showing a motor control system according to a fourth embodiment of the invention.

In some embodiments, a control system is provided for operating the motor 180 when the CVT belt is being engaged. On typical CVT systems, the drive clutch releases the belt when the vehicle is idle. This causes the drive belt to become unengaged. The CVT belt becomes re-engaged when the drive clutch (i.e., sheaves) again clamp onto the belt. Occasionally during re-engagement, the belt is not clamped hard enough, which causes the belt to slip. This slipping sometimes results in damage to the CVT belt. An automatic control system is provided to operate the motor differently when the drive clutch is re-engaging the belt. FIG. 7 illustrates a basic control system 800 in accordance with this embodiment of the invention. At block 802, it is determined whether the drive clutch is re-engaging the belt. If so, then the speed of rotation of the motor is increased. If not, then the current speed of rotation of the motor is maintained. When the speed of rotation of the motor is increased, the rotation of the flyweights is also increased, which causes the moveable sheave to move even closer to the stationary sheave, thus clamping the belt harder to prevent slippage.

A switch or a sensor can be provided to feed input into block 802 of the control system 800. In some embodiments, a momentary switch is provided about the vehicle in proximity to the driver to manually select a re-engagement setting. For example, the driver could hold a button to select RE-ENGAGEMENT mode. Whenever the button is released, NORMAL mode would be automatically selected. This switch would then direct the driver's input to block 802 of the control system 800.

In preferred embodiments, a sensor and a processor are provided. The sensor detects parameters that indicate whether the drive clutch is re-engaging the belt such as engine speed and throttle position. The output of the sensor is then fed into the processor, which processes this information to determine whether the drive belt is being re-engaged. For example, a high throttle position, low engine speed, and low or no ground speed would mean that the belt is being re-engaged. The output of the processor is then fed into block 802.

Figure 8:
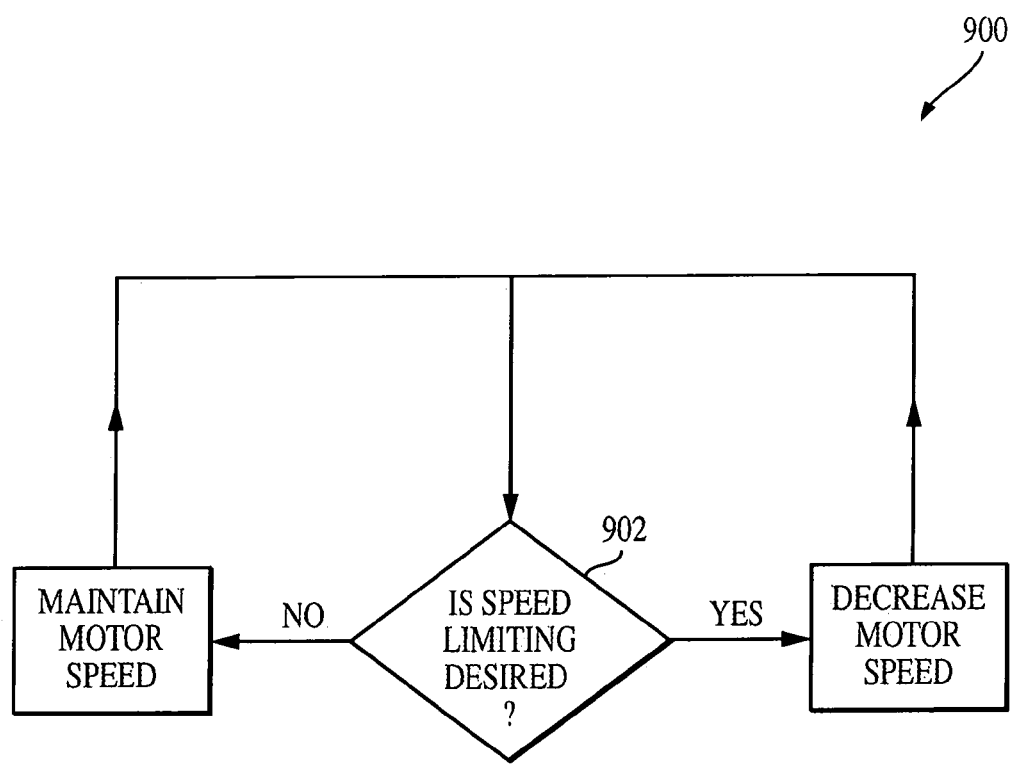
FIG. 8 is a block diagram showing a motor control system according to fifth embodiment of the invention.

In some embodiments, a control system is provided for operating the motor differently when speed limiting is desired. Often times, it is desirable to program a vehicle to prevent it from exceeding a certain speed. The speed of a vehicle can be limited by preventing the vehicle from shifting beyond a set gear ratio. An automatic control system is provided to operate the motor differently depending on whether speed limiting is desired. FIG. 8 illustrates a basic control system 900 in accordance with this embodiment of the invention. At block 902, it is determined whether speed limiting is desired. If so, then the speed of rotation of the motor is decreased. If not, then the current speed of rotation of the motor is maintained. When the speed of rotation of the motor is decreased, the rotation of the flyweights is also decreased, which allows the moveable sheave to remain at a distance further from the stationary sheave, thus preventing the vehicle from shifting beyond a set gear ratio.

A switch or a sensor can be provided to feed input into block 902 of the control system 900. In some embodiments, the vehicle driver decides whether speed limiting is desired. A switch is provided about the vehicle in proximity to the driver to manually switch between different speed limiting settings. For example, the driver could switch between a NORMAL and a SPEED LIMITING mode. This switch would then direct the driver's input to block 902 of the control system 900.

In other embodiments, a sensor and a processor are provided. The sensor senses operating parameters that indicate whether speed limiting is beneficial (e.g., sensing that the transmission is in reverse gear). The output of the sensor is then fed into the processor, which processes this information to determine whether speed limiting is to occur. The output of the processor is then fed into block 902. While specific control systems for operating the motor have been described, it should be apparent to one of skill in the art that many other control systems can be included to operate the motor.

In other embodiments, the vehicle driver manually operates the motor without the use of any control systems. In this case, a switch is preferably provided about the vehicle in proximity to the driver to enable the driver to manually operate the motor. In some embodiments, the driver simply switches between different modes of operation of the motor. For example, the modes of operation may comprise an OFF mode, a forward ON mode and a backward ON mode. Other modes of operation of the motor can also be provided. In other embodiments, the driver controls the exact speed of the motor. In either case, the vehicle driver manually operates the motor to establish a gear ratio optimal for use with a particular operating condition.

Figure 3:
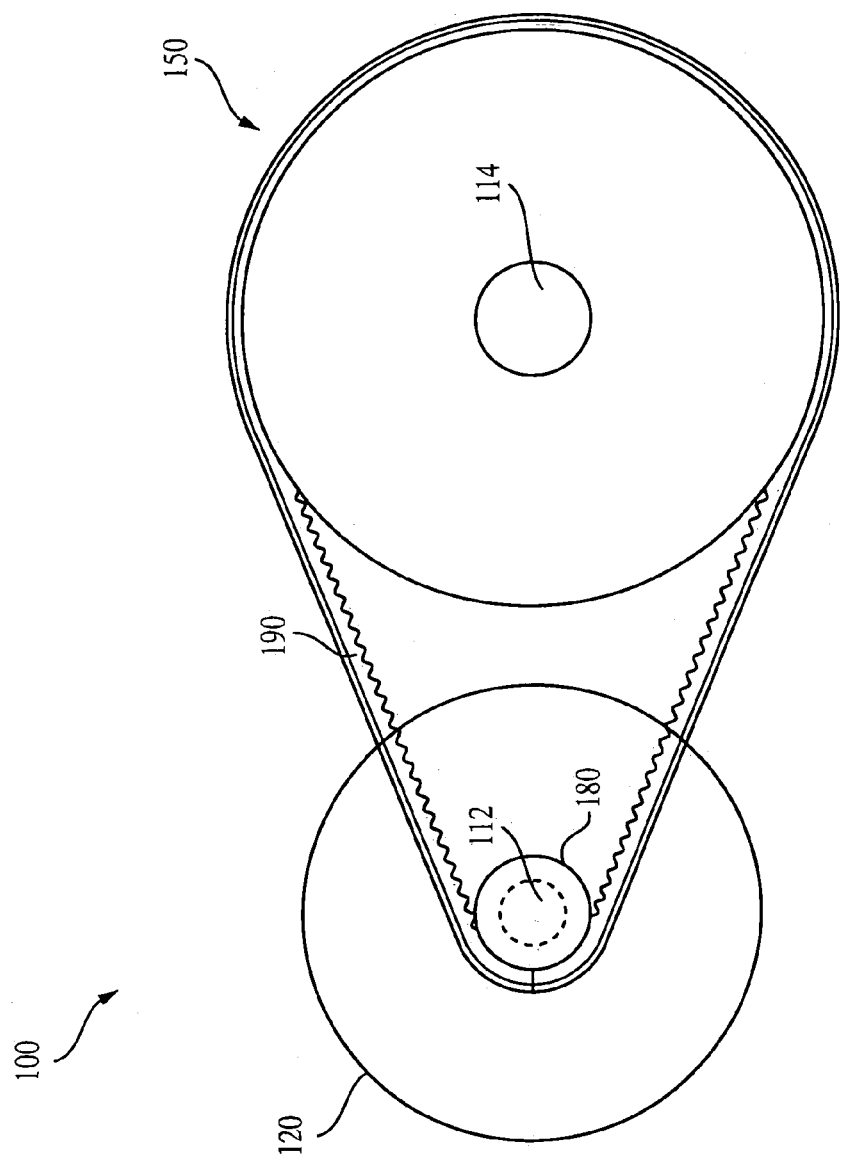
FIG. 3 is a side, partially broken-away view of a continuously variable transmission system incorporating a primary drive clutch of the present invention.

FIG. 3 is a side, partially broken away view of a continuously variable transmission system 100 incorporating a drive clutch 120 of the present invention. The system 100 shown in FIG. 3 includes a rotatable split sheave primary drive clutch 120 mounted to a rotatable input shaft 112 (which typically is connected directly to the vehicle's engine). A motor 180 is shown connected to and covering the input shaft 112. A rotatable split sheave secondary driven clutch 150 is mounted to a rotatable output shaft 114 (which typically is connected to additional drive train components and ultimately to the drive axle and wheels of the vehicle). An endless, generally V-shaped flexible drive belt 190 is disposed around the two clutches. The CVT system 100 shown in FIG. 3 is in the idle position. That is, the drive belt 190 is positioned near the periphery of the driven clutch 150 and near the center of the drive clutch 120. When the stationary sheave and the movable sheave are at maximum separation, the belt 190 can be continuously engaged or disengaged by the drive clutch 120. In embodiments where the belt 190 remains continuously engaged, torque is transmitted through the belt. In embodiments where the belt 190 becomes disengaged, torque is not transmitted through the belt.

While preferred embodiments of the invention have been described, it should be understood that various changes, adaptations and modifications may be made therein without departing from the spirit of the invention and the scope of the appended claims.

What is claimed is:

1. A drive clutch for a continuously variable transmission, the drive clutch connected to an input shaft that is rotatable about a longitudinal axis, comprising:
   a stationary sheave positioned about the input shaft;
   a movable sheave positioned about the input shaft, the movable sheave being movable closer to or further from the stationary sheave along the longitudinal axis;
   a motor connected to the input shaft and rotatable about the longitudinal axis, the motor being rotatable relative to the rotation of the input shaft; and
   a centrifugal weight system operably connected to the motor so as to pivot centrifugally outward relative to the longitudinal axis in response to the rotation of the motor, moving the movable sheave closer to or further from the stationary sheave.

2. The drive clutch of claim 1 wherein the motor is rotatable at a speed faster than the speed of rotation of the input shaft.

3. The drive clutch of claim 1 wherein the motor is rotatable at a speed equal to or slower than the speed of rotation of the input shaft.

4. The drive clutch of claim 1 wherein the motor comprises an electric motor.

5. The drive clutch of claim 1 wherein the centrifugal weight system comprises one or more flyweights and a reaction arm, the flyweights capable of pivoting centrifugally outward relative to the longitudinal axis upon rotation of the motor to cause the reaction arm to move the movable sheave closer to or further from the stationary sheave.

6. A drive clutch for a continuously variable transmission, the drive clutch connected to an input shaft that is rotatable about a longitudinal axis, comprising:
   a stationary sheave positioned about the input shaft;
   a movable sheave positioned about the input shaft, the movable sheave being movable closer to or further from the stationary sheave along the longitudinal axis;
   a centrifugal weight system for pivoting centrifugally outward relative to the longitudinal axis in response to rotation, moving the movable sheave closer to or further from the stationary sheave, wherein the centrifugal weight system is rotatable independently of the input shaft through the use of an actuator.

7. The drive clutch of claim 6 wherein the actuator comprises a motor.

8. The drive clutch of claim 7 wherein the motor comprises an electric motor.

9. The drive clutch of claim 6 wherein the centrifugal weight system is rotatable at a speed faster than the speed of rotation of the input shaft.

10. The drive clutch of claim 6 wherein the centrifugal weight system is rotatable at a speed equal to or slower than the speed of rotation of the input shaft.

11. The drive clutch of claim 6 wherein the centrifugal weight system comprises one or more flyweights and a reaction arm, the flyweights capable of pivoting centrifugally outward relative to the longitudinal axis upon rotation of the centrifugal weight system to cause the reaction arm to move the movable sheave closer to or further from the stationary sheave.

12. A continuously variable transmission connectable between a source of rotary motion, which includes an input shaft and a driven device, comprising:
   (a) a drive clutch connected to an input shaft for rotating about a longitudinal axis;
   (b) a driven clutch connected to the driven device;
   (c) a belt connected between said drive clutch and said driven clutch and operable to transmit rotary motion therebetween;
   wherein the drive clutch comprises:
       (i) a stationary sheave positioned about the input shaft;
       (ii) a movable sheave positioned about the input shaft; the movable sheave being movable closer to or further from the stationary sheave along the longitudinal axis;
       (iii) a motor connected to the input shaft and rotatable about the longitudinal axis, the motor being relative to the rotation of the input shaft; and
       (iv) a centrifugal weight system operably connected to the motor so as to pivot centrifugally outward relative to the longitudinal axis in response to the rotation of the motor, moving the movable sheave closer to or further from the stationary sheave.

13. The drive clutch of claim 12 wherein the motor comprises an electric motor.

14. The drive clutch of claim 12 wherein the belt is continuously engaged by the drive clutch when the stationary sheave and the movable sheave are at maximum separation.

15. The drive clutch of claim 12 where the belt is disengaged by the drive clutch when the stationary sheave and the movable sheave are at maximum separation.

16. The drive clutch of claim 12 wherein the motor is rotatable at a speed faster than the speed of rotation of the input shaft.

17. The drive clutch of claim 12 wherein the motor is rotatable at a speed equal to or slower than the speed of rotation of the input shaft.

18. The drive clutch of claim 12 wherein the centrifugal weight system comprises on or more flyweights and a reaction arm, the flyweights capable of pivoting centrifugally outward relative to the longitudinal axis upon rotation of the motor to cause the reaction arm to mover the movable sheave closer to or further from the stationary sheave.

19. A drive clutch of a transmission system, the drive clutch comprising:
   an input shaft coupled to an engine wherein the input shaft rotates about a longitudinal axis at a speed;
   a stationary sheave coupled to the input shaft wherein the stationary sheave rotates about the longitudinal axis at the same speed as the input shaft;
   a movable sheave coupled to the input shaft wherein the movable sheave rotates about the longitudinal axis at the same speed as the input shaft, the movable sheave also movable along the longitudinal axis;
   a motor coupled to the input shaft and having an interface; and
   a centrifugal weight system disposed about the input shaft adjacent to the movable sheave and coupled to the interface of the motor so that the weight system rotates at the speed of the interface of the motor wherein the weight system moves the movable sheave closer to or further from the stationary sheave depending on the speed of its rotation;
   wherein the motor is operable in an off mode, a positive on mode, or a negative on mode, wherein when the motor is operating in the off mode, its interface rotates at the same speed as the input shaft, when the motor is operating in the positive on mode, its interface is rotating faster than the input shaft and when the motor is operating in a negative on mode, its interface is rotating slower than the input shaft.

20. The drive clutch of claim 19 wherein the motor comprises an electric motor.

21. The drive clutch of claim 19 wherein the centrifugal weight system comprises one or more flyweights and a reaction arm, the flyweights capable of pivoting centrifugally outward relative to the longitudinal axis upon rotation of the interface of the motor to cause the reaction arm to move the movable sheave closer to or further from the stationary sheave.

22. A drive clutch for a continuously variable transmission, the drive clutch connected to an input shaft that is coupled to an engine of a vehicle and rotatable about a longitudinal axis, comprising:

a stationary sheave positioned about the input shaft;

a movable sheave positioned about the input shaft, the movable sheave being movable closer to or further from the stationary sheave along the longitudinal axis;

a centrifugal weight system for pivoting centrifugally outward relative to the longitudinal axis in response to rotation, moving the movable sheave closer to or further from the stationary sheave;

a means operably coupled to the input shaft for rotating the centrifugal weight system independently of the rotation of the input shaft.

* * * * *